(12) United States Patent
Morel et al.

(10) Patent No.: US 11,644,857 B2
(45) Date of Patent: May 9, 2023

(54) UNIVERSAL CONTROL BUTTON FOR CONTROL PANEL

(71) Applicant: THALES, Courbevoie (FR)

(72) Inventors: Philippe Morel, Jouy le Moutier (FR); Thierry Clerc, Paris (FR); Bernard Buisset, Heudicourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/285,085

(22) PCT Filed: Oct. 17, 2019

(86) PCT No.: PCT/EP2019/078226
§ 371 (c)(1),
(2) Date: Apr. 13, 2021

(87) PCT Pub. No.: WO2020/079156
PCT Pub. Date: Apr. 23, 2020

(65) Prior Publication Data
US 2022/0026942 A1 Jan. 27, 2022

(30) Foreign Application Priority Data

Oct. 18, 2018 (FR) ...................................... 1801097

(51) Int. Cl.
*G05G 1/02* (2006.01)
*B64D 43/00* (2006.01)
*H01H 13/14* (2006.01)

(52) U.S. Cl.
CPC .............. *G05G 1/02* (2013.01); *B64D 43/00* (2013.01); *H01H 13/14* (2013.01); *H01H 2221/044* (2013.01); *H01H 2235/01* (2013.01)

(58) Field of Classification Search
CPC .......... G05G 1/02; B64D 43/00; H01H 13/14; H01H 2221/044; H01H 2235/01;
(Continued)

(56) References Cited

U.S. PATENT DOCUMENTS

| 8,969,749 B2* | 3/2015 | Nishikawa | F16H 25/125 200/526 |
| 2012/0061227 A1* | 3/2012 | Chu | H01H 13/023 200/520 |

FOREIGN PATENT DOCUMENTS

| EP | 3 098 965 A1 | 11/2016 |
| FR | 2 192 398 A1 | 2/1974 |

(Continued)

*Primary Examiner* — Lheiren Mae A Caroc
(74) *Attorney, Agent, or Firm* — BakerHostetler

(57) ABSTRACT

A control button which includes a button head having an upper end acting as a pressing surface for initiating an action, and a lower end having at least one electrical connector; an internal button body into which the button head can be inserted; an external button body comprising an upper end and a lower end, the upper end being open for the insertion of the internal button body such that it comes into abutment and the pressing surface of the button head protrudes, and such that the at least one electrical connector emerges from the lower end of the external button body, the flanks of the external button body between the upper end and the lower end not being solid and having material openings, the open structure of the external button body allowing compression of the external body along the axis of the button, the control button being wherein the lower base of the external body of the button has housings for accommodating different contacts of the internal body of the button when the latter is inserted.

9 Claims, 6 Drawing Sheets

(58) Field of Classification Search
CPC ........ H01H 13/04; H01H 13/10; H01H 13/12; H01H 13/50; H01H 13/506; H01H 13/52; H01H 3/12; H01H 13/02; H01H 13/70; H01H 13/705; H01H 13/7057; H01H 2221/036

See application file for complete search history.

(56) References Cited

FOREIGN PATENT DOCUMENTS

| | | |
|---|---|---|
| JP | S56-109128 U | 8/1981 |
| WO | 2011-107958 A1 | 9/2011 |

\* cited by examiner

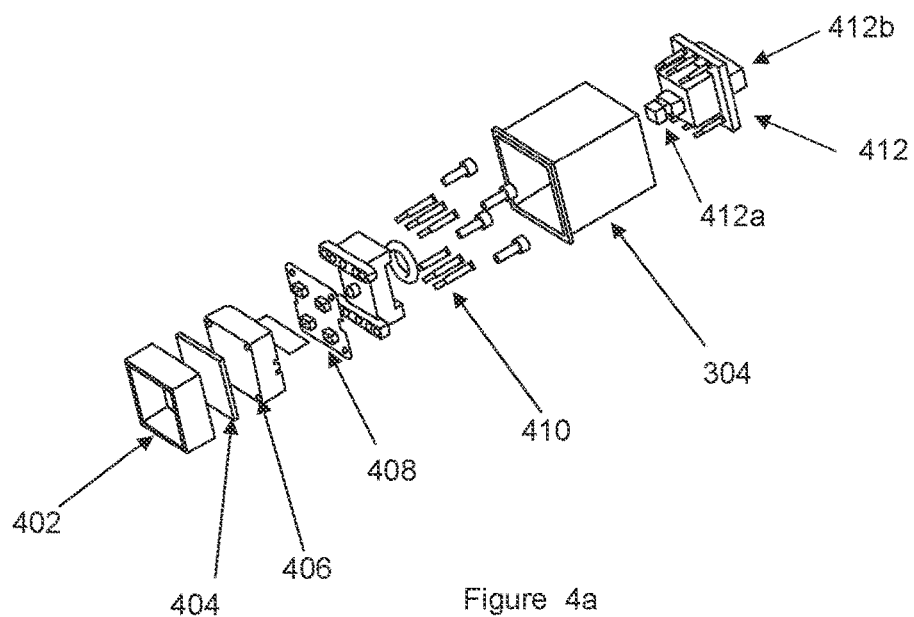
Figure 4a
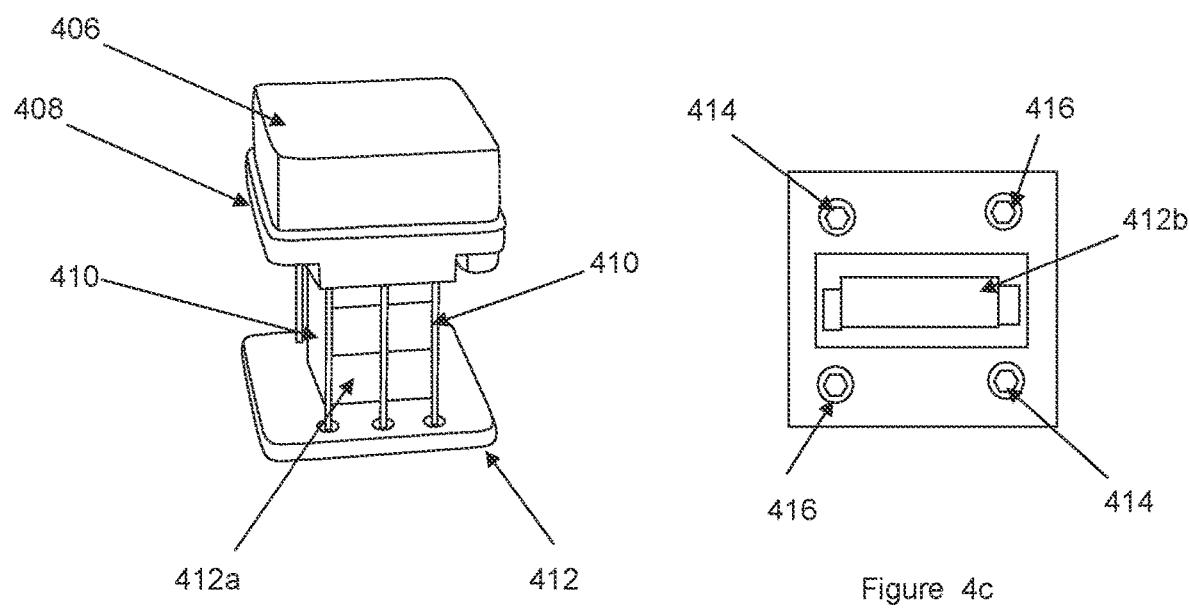
Figure 4b
Figure 4c

UNIVERSAL CONTROL BUTTON FOR CONTROL PANEL

CROSS-REFERENCE TO RELATED APPLICATIONS

This application is a National Stage of International patent application PCT/EP2019/078226, filed on Oct. 17, 2019, which claims priority to foreign French patent application No. FR 1801097, filed on Oct. 18, 2018, the disclosures of which are incorporated by reference in their entirety.

FIELD OF THE INVENTION

The invention relates to the field of control panels, in particular for aircraft cockpits, and relates in particular to a universal control button suitable for any type of panel regardless of the cockpit.

BACKGROUND

In the aeronautical field, aircraft cockpit control panels comprise a certain number of control buttons that the pilots use to execute avionics functions. The control buttons are generally of the pushbutton type, which may be switches or potentiometer turn buttons. The number of buttons can vary depending on the control panels and the size thereof may impose certain constraints for positioning on the panel on control panel manufacturers.

FIG. 1 schematically illustrates a face-on view of an example of an aircraft cockpit control panel comprising pushbuttons. FIGS. 2a and 2b schematically illustrate known types of pushbuttons for control panels. A first known type in FIG. 2a is a screw pushbutton (202), and another known type in FIG. 2b is a pushbutton having an insertion spring lug (204).

However, a control panel or a front face of a cockpit does not have a constant and standard thickness. The differences in thickness of the panels may range from 1 mm to 7 mm and depend, inter alia:
  on the technology used for manufacturing them;
  on the type of carrier (helicopter, tank, military airplane, commercial airplane, etc.); or
  on the need to integrate, for example, a backlighting function or not; etc.

In the field of aeronautical simulation, in order to address this variety of panels and avoid the need to manufacture specific buttons for each type of control panel, certain solutions consist in fitting a nut (203) on the head of the screw buttons in order to compensate for the different thicknesses of the panels. Other approaches consist in fitting helical springs (207) at the end of the body of the pushbuttons (206), as is illustrated in FIG. 2c. These solutions cause a significant extra manufacturing cost. Thus, in the case of the manufacture of buttons that can adapt to different representations of control panels in an aircraft simulator, the extra cost caused by the addition of helical springs may represent up to 40% of the cost of manufacturing the button.

Furthermore, existing solutions having spring lugs require the provision of a space between each button such that it is possible to access the lugs and pinch them in order to remove the button (it is only possible to remove the button by compressing the spring lugs). This then prevents any configuration of buttons in an array as used in certain on-board equipment.

The patent application EP 3 098 965 A1 proposes a control button which has a universal base and interchangeable control modules that are mounted selectively on the universal base. The control module is chosen depending on the type of function controlled and on the nature of the orders of the control. The base is intended to be fastened to a control panel in the cockpit of an aircraft. However, the thickness of the panel to which the base is intended to be fastened is not taken into account by the base. In addition, the problem of the variability of thickness of the panels still remains.

Moreover, the need exists to have control buttons that can adapt to any type of control panel regardless of the thickness of the panel while ensuring good mechanical integrity of the buttons.

The present invention proposes meeting this need.

SUMMARY OF THE INVENTION

An object of the present invention is to propose a universal control button, of the pushbutton or switch type, which is adaptable to any control panel.

The invention will find an advantageous application in the field of flight simulators, and in particular for the front faces of control panels of different aircraft cockpits.

The invention could more generally be applied in all industrial fields to equipment (professional, consumer, civilian, military) having boards or panels having control buttons or switches, for example for motor vehicles (car dashboard), railroad vehicles (train dashboard), information technology (keyboard buttons), consumer goods (control panel of white goods), the field of training and gaming simulation, etc.

Advantageously, the control button as claimed makes it possible to create arrays of contiguous buttons since it is not necessary to have a space between each button.

To this end, the subject of the invention is a control button comprising:
a button head having an upper end acting as a pressing surface for initiating an action, and a lower end having at least one electrical connector;
an internal button body into which the button head can be inserted;
an external button body comprising an upper end and a lower end, the upper end being open for the insertion of the internal button body such that it comes into abutment and the pressing surface of the button head protrudes, and such that said at least one electrical connector emerges from the lower end of the external button body;
the control button being characterized in that the flanks of the external button body between the upper end and the lower end are not solid and have material openings, the open structure of the external button body allowing compression of the external body along the axis of the button.
According to embodiments:
the external body of the button has a square or rectangular shape, and the openings produce faces that each have an S-shaped material structure.
the external body of the button has a cylindrical shape and the openings produce an external surface that has a material structure in the form of a helical strip.
the external body of the button is made of an elastomeric material.
the external button body has the same shape as the internal button body.
the external body of the button is produced by a 3D printing technique.

the lower base of the external body of the button has housings for accommodating different contacts of the base of the internal body of the button when the latter is inserted.

the control button is a pushbutton or a switch.

the head of the control button has a square or rectangular or round or oval shape.

The invention also covers a control panel, in particular for an aircraft cockpit, comprising one or more control buttons as claimed.

The invention also applies to a flight simulator comprising a control panel equipped with control buttons as claimed.

BRIEF DESCRIPTION OF THE DRAWINGS

Various aspects and advantages of the invention will become apparent from the description of a preferred but nonlimiting mode of implementation of the invention, with reference to the following figures:

FIGS. 4a to 4c schematically illustrate a pushbutton head for a control button according to the invention in one embodiment;

DETAILED DESCRIPTION

In a general manner, in order to respond to the above-mentioned problem, a universal control button is proposed, in which the external body of the button is adaptable to the thickness of the panel into which the button is inserted.

The generic term "button" used in the present description denotes either a screw button, a pushbutton, a switch, or any type of button having a button head and a button body.

Figure 3:
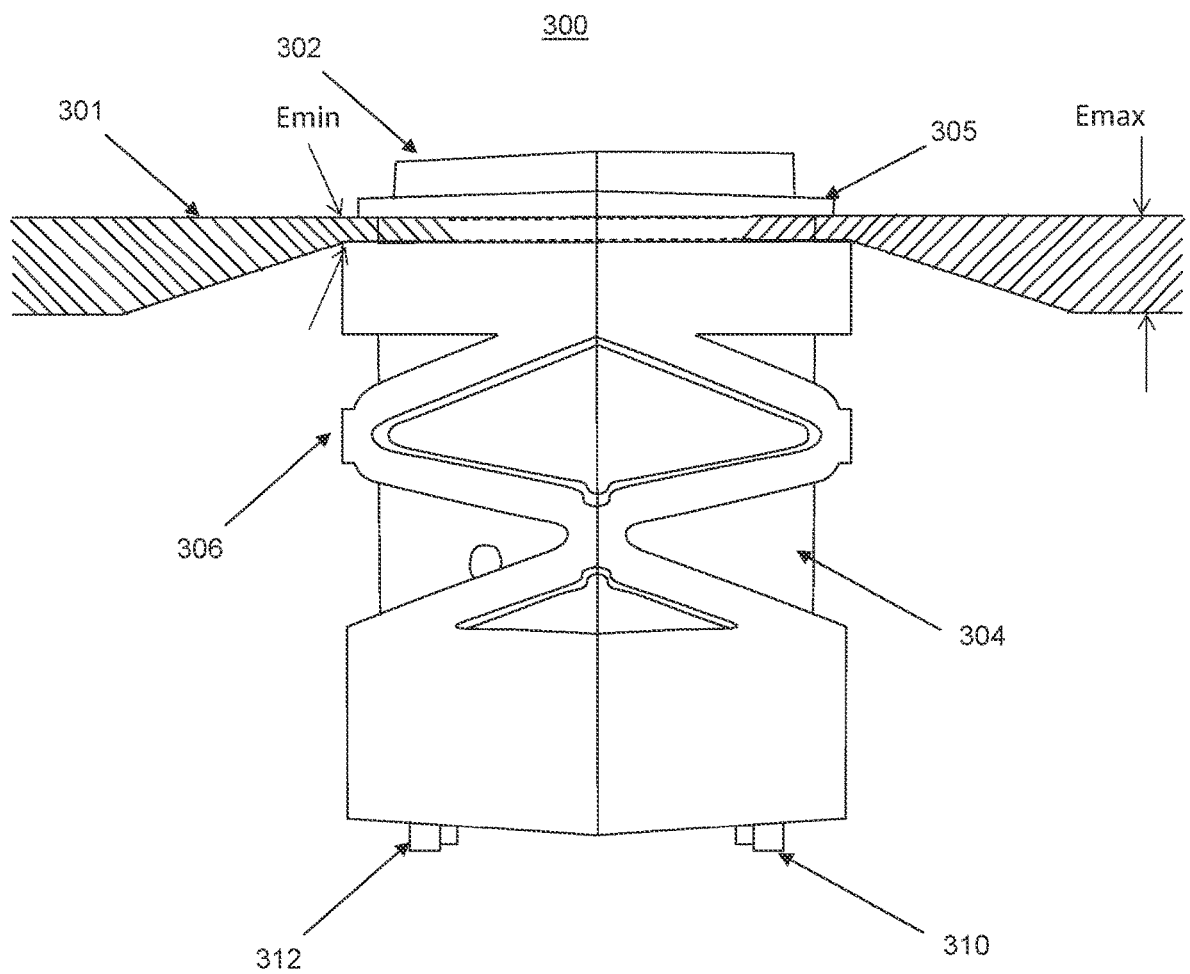
FIG. 3 schematically illustrates a control button according to the invention in one embodiment.

FIG. 3 schematically illustrates a control button (300) according to the invention in one embodiment. The complete control button comprises a button head (302) or cap, an internal button body (304) and an external button body (306). The control button is intended to be inserted into and held in a housing of a control panel (301).

The button head (302) corresponds to a pressing surface, visible on the external face of a control panel when the button is inserted into the latter. The proposed button is thus intended to be used in a control panel for example of an aircraft cockpit, as an interaction means via the pressing surface between the person and the machine. Depending on the use context, a control panel has a given thickness 'E', which may be different from one panel to another and vary in a range from a minimum thickness 'Emin' to a maximum thickness 'Emax'.

FIGS. 4a to 4c schematically show in detail the structure of a button head for a control button according to the invention.

FIG. 4a shows the assembly of the individual components of a button head, which comprises, starting from the user interface side:

an upper frame (402);

a protective glass (404);

a diffuser (406) on which the protective glass is placed, followed by the upper frame;

a printed circuit board (408) comprising lamps of the SMD LED type in order to be visible through the diffuser, which is preferably translucent;

spring contacts (410), which have a dual function: that of carrying electrical signals from at least one connector (412b) situated at the lower end of the button head to the LED lamps (thereby avoiding very fiddly and expensive wiring), and that of returning a mechanical force so that a user experiences a sensation of resistance when they press on the surface (406);

a printed circuit board or base (412) forming the lower end of the button head and having, on its internal side, a pusher or a switch (412a) and, on its external side, a connector (412b), as can be seen in FIGS. 4b and 4c.

During the assembly of the button, the subassembly of components (402 to 410) of the upper part of the button head is inserted into the internal body (304), and the two elements (upper subassembly, internal body) are fastened to one other by the base (412), which has screws (414) that are screwed into the internal body of the control button. In one embodiment, as illustrated, of a square control button, two 'button head/internal body' fastening screws are disposed in opposite corners of the base.

The base also comprises cylindrical holes (416) in order to make it possible to screw the 'button head/internal body' assembly to the external body (306) of the button.

Returning to FIG. 3, the internal body of the button has, at its upper end, a shoulder (305), which comes to bear on the front face of the control panel (301) when the button is inserted into the control panel.

The control buttons according to the invention may have simple shapes, for example the one in FIG. 3, or be more ergonomically complex. The buttons may be equipped with small, rough protrusions or with overthicknesses, making it possible to identify a particular button by virtue of finger sensitivity.

In certain embodiments, a control button may have a lamp for indicating the state of the circuit, which may form all or part of the button or be offset close to the button.

The example in FIG. 3 is simplified with a square button so as make it easy to understand the principles of the invention, but it is not limiting in terms of size, or of shape, and, according to embodiment variants and the applications of the control panel to be equipped, the buttons may have different sizes and shapes.

Furthermore, the control buttons of the invention may have various colors, complying with a standardized color code, for example important buttons in red for stopping or in green for starting.

In other variants, the buttons may have, on their visible faces, pictograms for representing the process that pressing the button will initiate, or may have inscriptions. They may also be backlit to make them easier to use in the dark or in half-light.

According to embodiment variants, the pressing surface of the protective glass may be convex or concave, so that the button can be found better by a finger without being looked at. The protective glasses can be made of polymethyl methacrylate (PMMA) or Lexan. They may be screen-printed so that, by transparency, the user can see, in the desired color, the text or shape illuminated by the LEDs of the button.

The solution proposed is not limiting and aims to cover any embodiment variant. The novel and inventive principle of the invention consists in having an external button body that integrates a spring function. The external body of the button is preferably made of a material having elastic properties appropriate for allowing a spring function, for example elastomers. In one embodiment, the material used is a photoreactive polymer resin such as a mixture of methacrylic acid esters, photoinitiators, exclusive pigment and an additive binder.

Figure 5:
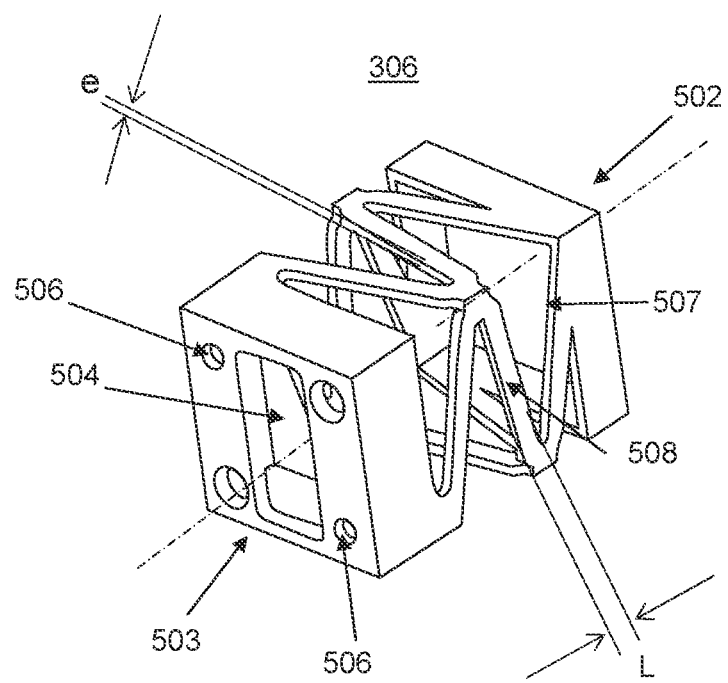
FIG. 5 schematically illustrates a control button body according to the invention in one embodiment.

FIG. 5 schematically illustrates an external body (306) of a control button according to the invention, in an embodiment like the one in FIG. 3. As can be seen in FIG. 5, the external body of the button is open at its upper end (502), making it possible to slide it over an 'internal button body/button head' assembly, the latter being inserted into a control panel through the front of the panel. The external body of the button is fastened to the 'internal button body/button head' assembly via the rear of the control panel by a screw assembly, and depending on the thickness of the control panel, the external body is compressed by the screwing.

The external body of the control button comprises a lower base (503) having cylindrical holes (506) corresponding to the holes (414, 416) in the base of the button head, the former allowing the button head to be screwed to the internal body and the latter allowing the external body to be screwed to the 'internal button body/button head' assembly. The external body of the button is fastened to the 'internal button body/button head' assembly via the rear of the control panel by a screw assembly (310 and 312), and depending on the thickness of the control panel, the external body is compressed by the screwing. The lower base of the external body additionally comprises a cutout (504) allowing the electrical connector (412b) of the button head to pass through.

The flank (or face) or the various outer flanks (or faces) (508) of the external control button body, which are situated between the upper end (502) and the lower end (503), are not solid and have material openings (507). In the case of a cylindrical button, the principle of the invention applies to the flank of the cylinder, which is not solid and forms a helical strip of material.

Advantageously, the outer flank(s) or face(s) is/are open with functional ergonomics, making it possible for the external body to be able to be deformed along the axis of the button. According to the example shown of a square or rectangular button body, the opening made produces flanks of the external button body that each have an S-shaped structure, creating turns that can be compressed during the screwing of the external body of the button while it is being assembled on a control panel. Thus, on account of its structure that is independent of the shape of the button and of the thickness of the control panel, the external body provides a spring function that makes it possible to compress the turns depending on the thickness of the panel into which the button is inserted. The external body of the button has an initial height which, by compression, is adapted such that the button is fastened and held in the panel in which it is housed.

Figure 6A:
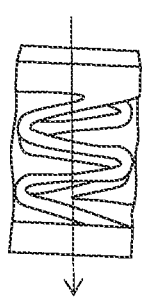
FIG. 6a-6c illustrate various deformations of the body of the control button according to the invention for compensating for different variations in thickness of control panels.
Figure 6B:
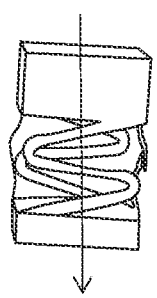
Figure 6C:
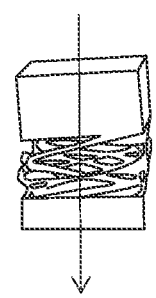

FIG. 6a-c illustrate several deformations of the external body of the button by compression of the turns, making it possible to compensate for the variations in thickness of the control panels. Advantageously, the spring function of the external body of the button, which is produced by design, makes it possible to fasten the button to panels having a varying thickness, in particular to panels of which the thickness can vary between 1 mm and 7 mm. The variation in thickness is thus made up for by the deformation of the external button body due to the compression of the turns of the spring, as can be seen in the three states representing three different control panel thicknesses.

It should be noted that excessive compression of the external body of the button, which would bring the turns of the spring into contact with one another, is not desirable, since it could cause irreversible mechanical deformations.

Further ergonomic variants of openings can be produced for the external button body, which may have, for example, a cylindrical, oval, hexagonal, etc. shape. The openings chosen need to ensure, by design, the spring function of the external body. The external body produced has to have at least the following characteristics:

have no material discontinuity between the top and bottom ends of the spring, i.e. there is a continuous strip of material (on each face or flank for an external body of square or rectangular shape);

have a predefined number of turns for forming the spring of width 'L' and thickness 'e' so as to allow optimal compression of the spring.

Advantageously, the external body of the button may be produced by 3D printing techniques using a 3D printer of SLA (stereolithography) technology for example, on the basis of a CAD model created for the desired button body shape. Compared with the solid button bodies produced by 3D printing, the 3D manufacture of the open external button body of the invention allows a saving of material and a shorter printing time. Advantageously, the production and integration of the buttons are greatly simplified.

Furthermore, the simple functional structure of the external button body of the invention makes it possible to do away with spacers, conventional screw fasteners, but also the associated labor, all of these elements having an impact on the final manufacturing cost.

Figure 7:
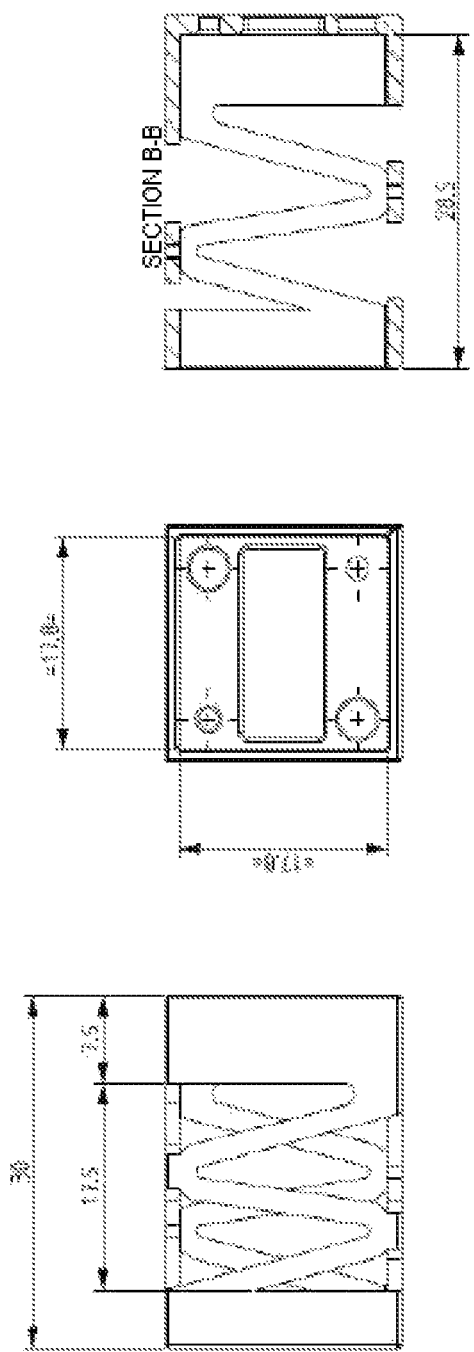
FIG. 7 illustrates measurements of a control button according to the invention for a specific application in an aircraft simulator.

FIG. 7 illustrates measurements of an external control button body according to the invention for a specific application in an aircraft simulator. The external body produced is for a square button measuring 20 mm×20 mm with a width of turns of the spring L=2 mm and a thickness of the turns e=1 mm.

Figure 1:
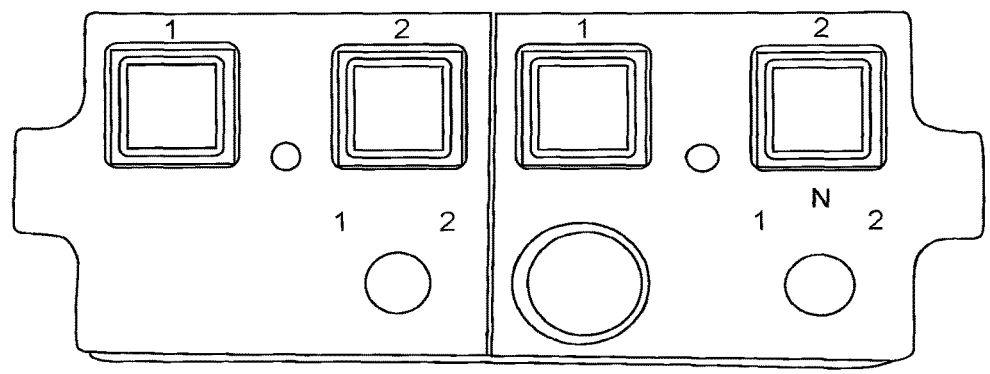
FIG. 1 schematically illustrates a face-on view of an example of a control panel of an aircraft cockpit comprising pushbuttons.
Figure 2A:
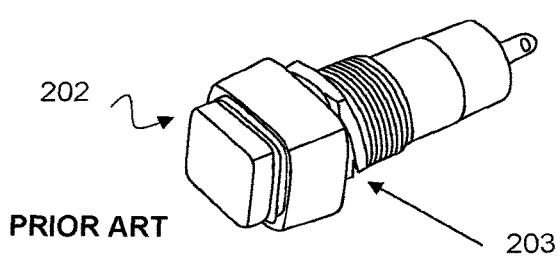
FIGS. 2a to 2c schematically illustrate different types of pushbuttons for control panels.
Figure 2B:
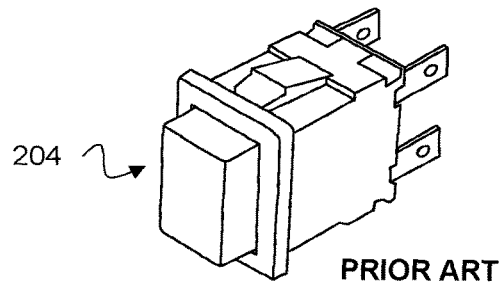
Figure 2C:
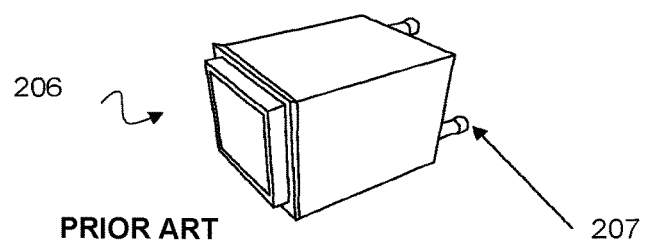
Figure 8:
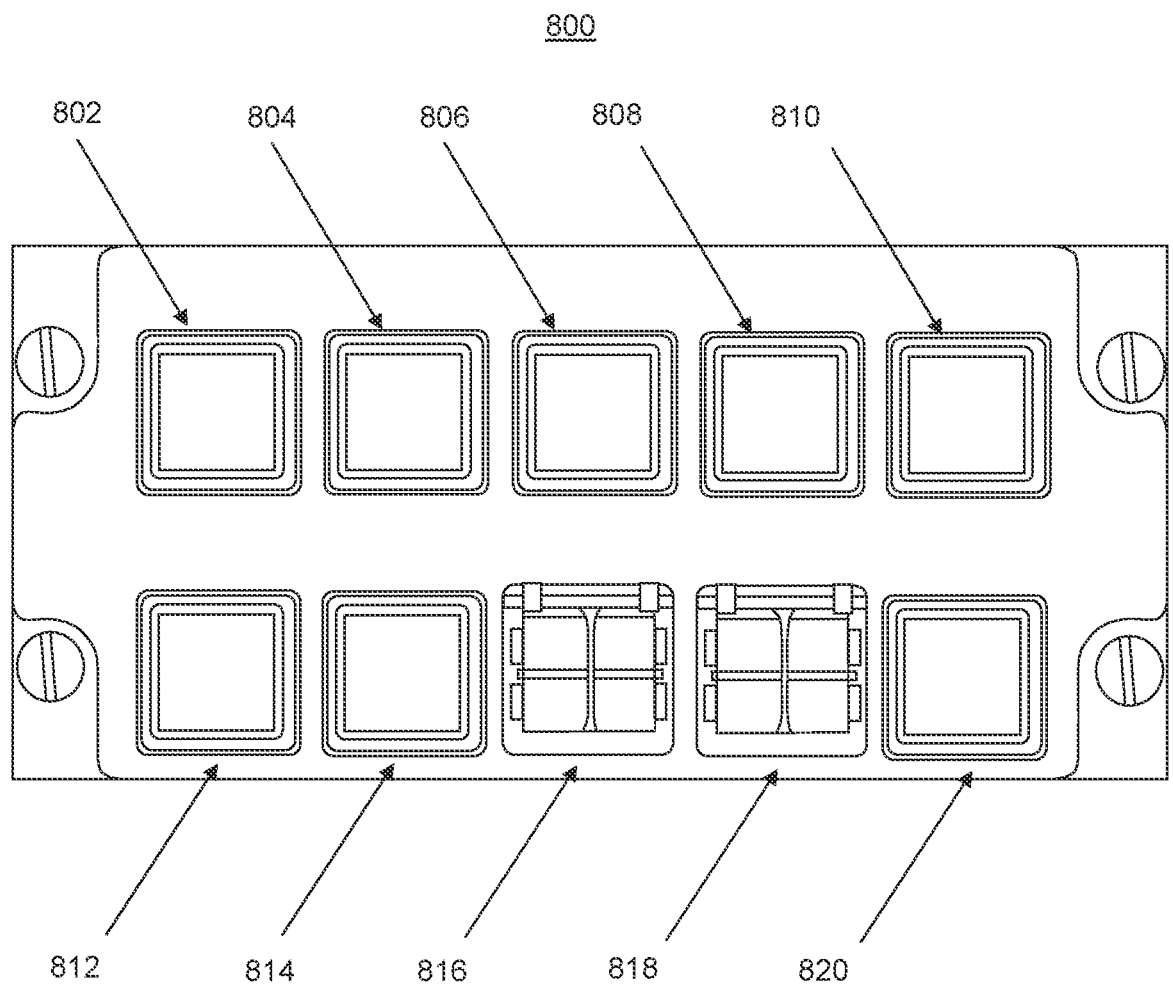
FIG. 8 illustrates an array of buttons for a control panel according to the principles of the invention.

FIG. 8 illustrates an array of buttons (802 to 820) according to the principles of the invention, equipping a control panel (800). Advantageously, the structure of the button makes it possible for the buttons to be contiguous on a panel, unlike the prior art panels, shown for example in FIG. 1.

The present description illustrates one embodiment of the invention, but is not limiting. The example was chosen to allow easy understanding of the principles of the invention, and a specific application, but is not exhaustive, rather the description should allow a person skilled in the art to apply modifications and implementation variants while retaining the same principles.

The invention claimed is:

1. A control button comprising:
   a button head having an upper end acting as a pressing surface for initiating an action, and a lower end having at least one electrical connector;
   an internal button body into which the button head can be inserted;
   an external button body comprising an upper end and a lower end along a central axis defined by the control button, the upper end being open for the insertion of the internal button body such that the internal button body and the external button body come into abutment and the pressing surface of the button head protrudes, and such that said at least one electrical connector emerges from the lower end of the external button body, the external button body comprising one or more outer faces located between and connecting the upper end and the lower end of the external button body, each of the one or more outer faces defining a plurality of openings in said outer face and a plurality of flanks of said outer face between said plurality of openings, the flanks of the one or more outer faces defining turns of the external button body, such that the turns and the external button body can be compressed along the central axis of the control button such that the external button body fits a thickness of a panel into which the external button body is inserted;

wherein a lower base of the external button body of the control button defines one or more openings for accommodating different contacts of the internal button body of the control button when the latter is inserted, wherein the external button body retains a compressed form during operation of the control button.

2. The control button as claimed in claim 1, wherein the external button body of the control button has a square or rectangular shape, and the openings produce flanks that each have an S-shaped material structure.

3. The control button as claimed in claim 2, wherein the control button is a pushbutton or a switch.

4. The control button as claimed in claim 1, wherein the external button body of the control button has a cylindrical shape and the openings produce flanks that have a material structure in the form of a helical strip.

5. The control button as claimed in claim 1, wherein the external button body of the control button is made of an elastomeric material.

6. The control button as claimed in claim 1, wherein the external button body has a same shape as the internal button body.

7. The control button as claimed in claim 1, wherein the external button body of the control button is produced by a 3D printing technique.

8. The control button as claimed in claim 1, wherein the button head of the control button has a square or rectangular or round or oval shape.

9. A control panel, in particular for an aircraft cockpit, comprising one or more control buttons as claimed in claim 1.

* * * * *